Figure 1:
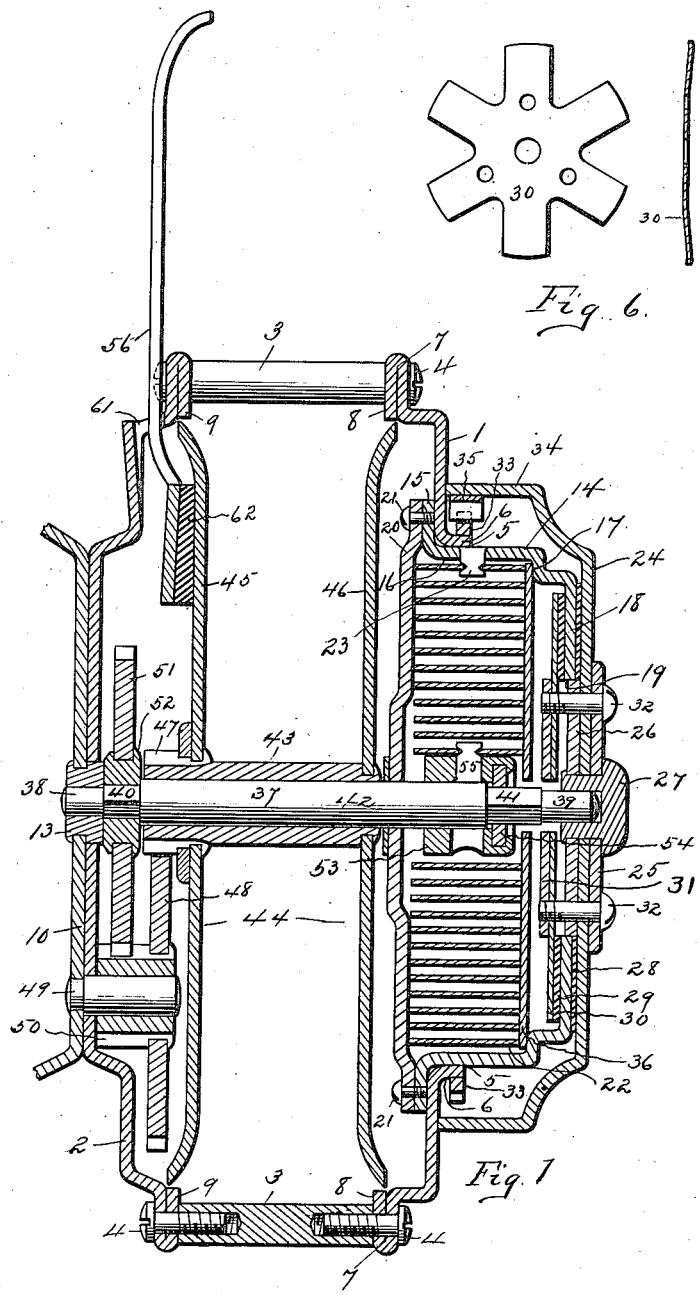

P. CATUCCI.
AUTOMATIC FISHING REEL.
APPLICATION FILED SEPT. 16, 1911.

1,064,816.

Patented June 17, 1913.

2 SHEETS—SHEET 1.

P. CATUCCI.
AUTOMATIC FISHING REEL.
APPLICATION FILED SEPT. 16, 1911.
1,064,816.
Patented June 17, 1913.
2 SHEETS—SHEET 2.
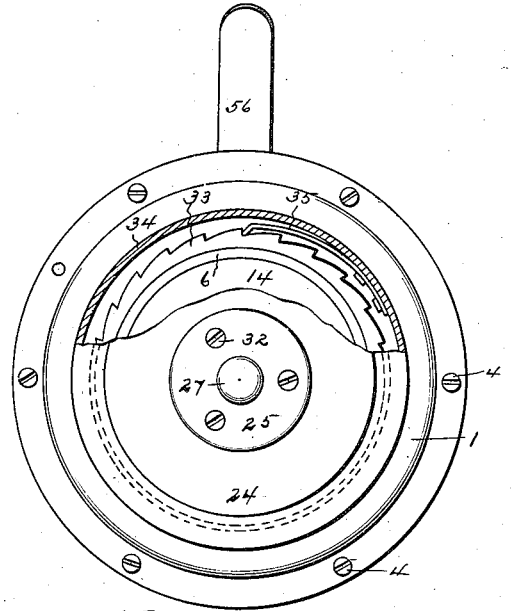
Fig. 2.
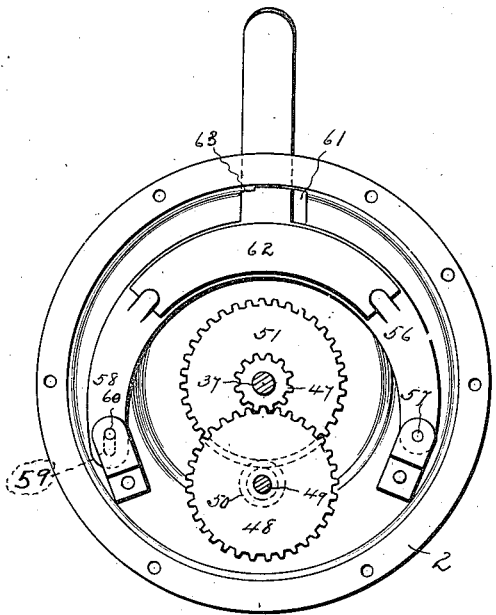
Fig. 3.
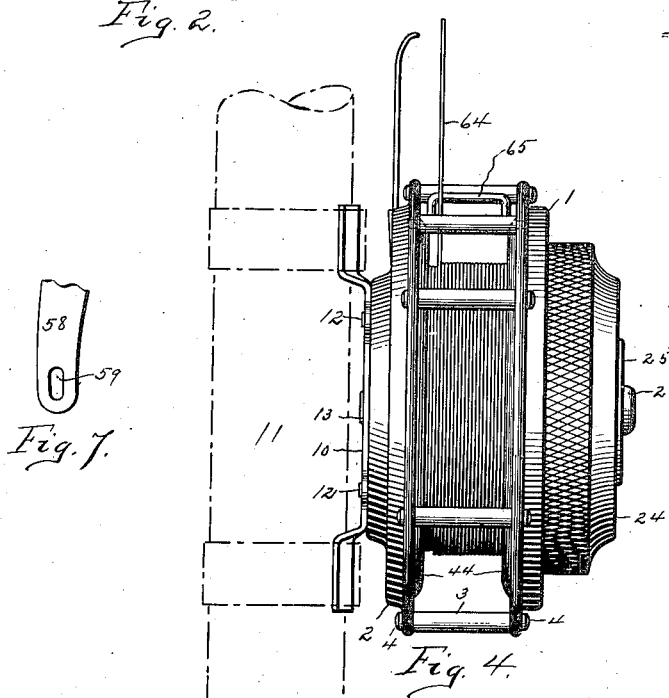
Fig. 7. Fig. 4. Fig. 5.
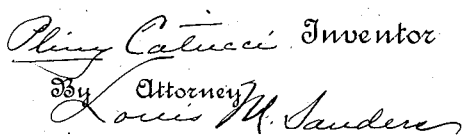
Witnesses:
Norman E. Zusi
Walter Finter
Pliny Catucci Inventor
By Louis M. Sanders Attorney

UNITED STATES PATENT OFFICE.

PLINY CATUCCI, OF NEWARK, NEW JERSEY, ASSIGNOR TO A. F. MEISSELBACH & BROTHER, A CORPORATION OF NEW JERSEY.

AUTOMATIC FISHING-REEL.

1,064,816.           Specification of Letters Patent.     Patented June 17, 1913.

Application filed September 16, 1911. Serial No. 649,707.

*To all whom it may concern:*

Be it known that I, PLINY CATUCCI, a citizen of the United States, residing in the city of Newark, county of Essex, and State of New Jersey, have invented certain new and useful Improvements in Automatic Fishing-Reels, of which the following is a full, clear, and exact description, such as will enable others skilled in the art to which it pertains to make, construct, and use the same.

My invention relates to that class of fishing reels wherein the line may be run off from the spool under spring tension, the spring being wound up during the running off process, and when so wound up, serving to rewind the line when desired, and also to hold it under spring tension after a fish has been caught, so as to avoid kinking or snarling the line whenever there shall be slack therein due to the fish running in toward the angler.

The object of the invention is to provide the reel with a safety friction device of a character to permit the line to be run out farther after the spring has been wound to its fullest tension or capacity, without in the least endangering the mechanism from too great a strain upon the line.

It also contemplates the interposition of a friction drag, which may be thrown into or out of action at the will of the angler, such drag serving the dual purpose of checking the free running out of the line and also the action of the spring in automatically winding in the line.

Other features of improvement will be disclosed in the following detailed description when taken in connection with the accompanying drawings.

In the drawings, Figure 1 illustrates in vertical section, the reel with all of its parts assembled. Fig. 2 is a front elevation, a part of the winding cap being broken away to show the ratchet upon the front head-plate. Fig. 3 is a rear view, with the back head-plate removed to show the driving gear train and plan of the friction drag. Fig. 4 is a side elevation of the entire reel as attached to a pole. Fig. 5 is a detail, showing the method of throwing the friction drag into and out of operation. Fig. 6 is a plan view of the friction plate which forms a part of the safety tension device. Fig. 7 is a detail of the drag.

Similar reference numerals refer to like parts throughout the specifications and drawings.

The frame of the reel consists of the front head-plate 1, and the back head-plate 2, connected together by means of the spacing posts 3, and the screws 4. The front head-plate consists of a disk of metal pressed to the shape as shown, having its center cut out as at 5, and the margin of the aperture so formed, flanged outwardly as at 6. The outer margin of the plate is turned back upon itself as at 7, to form a marginal reinforce 8, through which the screws 4, pass. The back head-plate 2, is pressed from a disk of metal into the shape as shown, with the margin turned back to form the reinforce 9, through which the screws 4, pass into the posts 3. The foot-plate 10, by which the reel is secured to the pole 11, is rigidly secured to the back-plate by means of the rivets 12. Through the foot- and back-plates is a central aperture into which is secured the spindle bearing 13.

The spring cup 14, is made from a disk of metal, pressed to the shape as shown in Fig. 1, with the marginal flange 15, the cylindrical portion 16, the shoulder 17, and the flat part 18, the latter being cut out to form the central aperture 19. The cap or cover 20, is secured to the flange 15, by means of the screws 21, as shown. Within the cup 14, is located the spring 22, the outer end of which is connected to the hook 23, the latter being struck in from the cylindrical body 16, of the cup. The external diameter of the cup body 16 is such that it fits into the aperture 5, of the head-plate 1, with the flange 6, forming a bearing for the cup-body 16, with the flange 15, serving to hold the cup in position and permit it to rotate freely in the bearing aperture 5. The winding cap 24, is pressed to the shape shown from a disk of metal, and is secured to the flat part 18, of the spring cup by a series of friction disks, as will now be described in detail. Upon the outer face of the cap 24, is the strengthening disk 25, and upon the inner face is the centering disk 26, of a diameter to fit and freely rotate in the aperture 19, of the cup 14. The winding cap 24, and the disks 25, and 26, are centrally apertured, and the spindle bearing 27, is fitted into the aperture and riveted down or spun over the disk 26, as shown, to hold the three parts together. Surrounding the disk 26, is a ring of oiled friction paper 28, which lies flat against the inner face of the cap 24. With the cap 24, placed upon the spring cup 14, and the disk 26, located in the aperture 19, there is next placed upon the inner flat part 18, of the spring cup, the ring of oiled friction paper 29, upon which is located the star spring disk 30, and lastly, upon the latter is placed the retaining disk 31. The screws 32, pass through the disks 25, 26, and 30, the face of the cap 24, the paper rings 28, and 29, and are screwed into the retaining disk 31. By this arrangement, the winding cap 24, is held in quite firm frictional engagement with the spring cup 14, in a manner to permit their relative rotation one upon the other, but with a degree of frictional retardation depending upon the tightness with which the screws 32, are screwed up. The star spring disk 30, is provided with the spring arms as shown, and is slightly dished or cambered, so as to make the degree of friction between the parts depend upon its elasticity when under compression.

Upon the outer circumference of the flange 6, is secured in any desired manner, as by soldering, the ratchet ring 33, and upon the inner circumference of the flange 34, of the cap 24, is the spring pawl 35, in position for engagement with the teeth of the ratchet 33.

Within the spring cup 14, and resting upon the shoulder 17, is the centrally apertured separating disk 36, which serves to keep the spring 22, from interfering with the friction mechanism, heretofore described.

The spindle 37, is mounted in the bearings 13, and 27, to freely rotate therein. The spindle is provided with the cylindrical journals 38, and 39, the squared portions 40, and 41, and the cylindrical body portion 42. Mounted upon the spindle body 42, is the sleeve or hub 43, of the spool 44, at the ends of which are the respective spool flanges 45, and 46. The end of the sleeve 43, is provided with a pinion 47, which has its teeth cut from an enlargement left upon the end. Meshing with the pinions 47, is the spur gear 48, mounted upon the stub shaft 49, which is secured, as shown, to the back head-plate 2. Rigidly connected with the gear 48, in any convenient manner, is the pinion 50, so that both gear and pinion rotate together. Meshing with the pinion 50, is the spur gear 51, having its hub 52, secured to the squared part 40, of the spindle 37. The arrangement is such that the rotation of the spindle 37, is communicated with increased speed around through the gear train to the spool 44. Upon the opposite end of the spindle body 42, is mounted the spring sleeve 53, with a square apertured washer 54, secured in a socket in its end, as shown, so that the square aperture takes over the squared part 41, of the spindle. This construction permits the sleeve 53, to slide a limited distance along the spindle, but the sleeve is constrained to rotate with the spindle. The sleeve 53, is provided with a hook 55, over which the inner end of the spring 22, is fastened.

The drag mechanism consists of the double armed spring lever 56, having one of its arms pivoted at 57, to the back head-plate 2, and its other arm 58, slotted as at 59, and located over the pin 60. The lever extends through a slot 61, in the back head plate 2. It is made of spring metal and slightly cambered, so as to normally rest in the bottom of the slot 61. Upon the inner face of the lever 56, is a strip of leather or other friction material 62, which bears upon the adjacent face of the spool flange 45. This forms a very effective drag; but in order to relieve the spool from the drag when desired, the slot 61, is provided with a shoulder 63, at one end, so that the lever may be slightly raised and swung laterally upon the pivot pin 57, and permitted to rest upon the shoulder 63. This results in lifting the friction leather 62, free from the spool flange 45, and thus relieves the drag.

The operation of the reel is as follows: With the drag in action, that is, the friction leather 62, bearing upon the spool flange 45, the angler turns the winding cap 24, in the direction to wind up the spring 22. Then with the inner end of the line 64, passed through the guide loop 65, pivotally secured in the marginal reinforces 8 and 9 and secured to the hub of the spool 44, the drag is released, when the spring 22, will begin to unwind, and through its connection with the sleeve 53, and spindle 37, cause the latter to rotate. But the spindle is connected through the train of multiplying gears to the spool 44. Thus, the force of the spring will be expended in rotating the spool 44, and the consequent winding of the line thereon. It will be understood that the spring pawl 35, and the ratchet 33, operate to prevent any reaction of the spring 22, when the winding cap 24, is released by the hand. After the line is wound in, it may be drawn off at will, the angler either alternately releasing the drag as the line is drawn off, and throwing it on again as the line is released for a fresh hold thereon, preparatory to drawing off another length of line; or the drag may be permanently released by setting the drag lever 56, upon the shoulder 63, after which, the angler may grasp the pole and line together just in advance of the reel with the left hand, and the free end of the line with the right hand, which may then draw off the line, alternately releasing the line with the left hand as it is drawn off with the right.

When a fish is caught, the angler may play it as he may wish, and without danger to the reel; for if the fish carries out the line nearly to its full length and after the spring 22 has been fully wound, the friction disks bearing upon the flat part 18, of the spring cup 14, will permit the line to be further drawn off without danger of breaking the spring. Again, any slack in the line, due to the fish running in, will be automatically taken up by the spring winding in the line, inasmuch as it is always under spring tension.

Should it ever happen that the winding in of the line should cause the spring to run completely down, a few turns of the winding cap 24, will serve to place the spring under sufficient tension to completely wind in the line. As a precautionary measure, it is always best to give the winding cap an occasional turn, in order that the spring may be kept constantly under sufficient tension. This may be done without fear of overwinding, as the friction disks operate automatically to prevent such a thing.

The friction connection between the winding cap 24, and the spring cup 14, may be readily adjusted by means of the screws 32, and this adjustment should always be to a point where the winding cap will carry the spring cup with it until the spring is completely wound.

I do not wish to confine myself to the specific mechanism shown for accomplishing the results set forth, as other equivalent devices will readily suggest themselves to those skilled in the art.

I claim:

1. In a fishing reel, the combination of a motor spring, a spring cup within which said motor spring is mounted, a spindle driven by said motor spring, a spool rotatably mounted upon said spindle, a multiplying gear train connecting said spindle and said spool, a winding mechanism consisting of a pair of friction disks and a spring disk for frictionally engaging said spring cup with a resilient pressure for winding up said spring.

2. In a fishing reel, the combination of a spool, a spindle upon which said spool is rotatably mounted, a multiplying gear train connecting said spindle and said spool, a coil spring mounted upon said spindle for driving the same, a spring cup inclosing and secured to the outer end of said spring, said spring cup having a friction disk associated therewith, a series of slipping friction disks and a spring disk for frictionally engaging said spring cup, with a resilient pressure for winding up said spring and to prevent overwinding the same.

3. In a fishing reel, the combination of a spool, a spindle upon which said spool is rotatably mounted, a multiplying gear train connecting said spindle and said spool, a coil spring for driving said spindle, and a winding device for winding up said spring, said winding device having a series of slipping friction disks including a spring disk interposed between the winding element and said spring, to prevent the overwinding of the latter.

4. In a fishing reel, the combination of a spool, a spindle upon which said spool is rotatably mounted, gear connections between said spindle and said spool, whereby the one may be rotated from the other, a spring having one of its ends connected to said spindle, a spring cup inclosing said spring and to which the other end of said spring is connected, and a winding device having resilient frictional engagement with said spring cup to permit said spring to be wound up and to prevent overwinding the same.

5. In an automatic fishing reel, the combination of a spool, a spindle upon which said spool is mounted, a spring cup, a coil spring within said cup, said spring having its outer end connected to said cup and its inner end connected to said spindle, a winding cap, and a series of friction disks including a spring disk for connecting said cap to said cup.

6. In an automatic fishing reel, the combination of a reel frame, a spindle rotatably mounted in said frame, a spool upon said spindle, a spring cup, a coil spring within said cup, said spring having its outer end connected to said cup and its inner end connected to said spindle, a winding cap, a series of friction disks including a spring disk for connecting said cap to said cup, and pawl and ratchet mechanism upon said cap and said frame.

7. In an automatic fishing reel, the combination of a frame, a spindle, a spool mounted upon said spindle, a spring cup, a coil spring within said cup, said spring having its outer end secured to said cup and its inner end secured to said spindle, a winding device resiliently and frictionally engaging said cup for winding up said spring and for preventing its overwinding and pawl and ratchet mechanism upon said cap and said frame for preventing said spring from unwinding.

8. In an automatic fishing reel, the combination of a spool, a line wound thereon, a spindle upon which said spool is mounted to be rotated thereby, a spring cup, a coil spring within said cup and connected thereto and to said spindle, winding mechanism resiliently and frictionally engaging said cup for winding up said spring, and brake mechanism for engaging said spool to normally prevent it from rotating and thereby unwind said spring.

9. In an automatic fishing reel, the combination of a reel frame, a spindle rotatably mounted in said frame, a spring cup rotatably mounted in said frame, a spring within said cup connected thereto and to said spindle, a winding cap, a series of friction disks connecting said cup and said cap to rotate said cup and thereby wind up said spring and pawl and ratchet mechanism connecting said cap and said frame to prevent the rotation of said cap in one direction and thereby prevent the running down of the spring.

10. In an automatic fishing reel, the combination of a frame, a spool rotatably mounted therein, a spring cup rotatably mounted in said frame, a coil spring within and secured to said cup, said spring being also connected through intervening mechanism to said spool to rotate the same in one direction, a winding cap, a series of friction plates connecting said cap to said cup, a spring disk associated with said plates for producing a resilient pressure thereon, a pawl upon said cap and a stationary ratchet upon said frame, whereby said cap may be rotated in one direction to wind up said spring but prevented from rotating in the opposite direction.

11. In a fishing reel, the combination of a spool, a spindle, a train of gears connecting said spindle and said spool, a spring for rotating said spindle in one direction, a spring cup inclosing said spring and connected to its outer end, said cup having an annular head, winding mechanism connected to the annular head, comprising a disk in frictional engagement with the inner face of said head, a second disk in frictional engagement with the outer face of said head, a winding cap secured to said disks.

12. In a fishing reel, the combination of a spool, a coil spring for rotating said spool, a spring cup having a flat annular head for inclosing said spring, and winding mechanism for winding up said spring, comprising a winding cap, and a series of disks secured to said cap, said disks having frictional engagement with the annular head of said spring cup.

13. In a spring winding mechanism for automatic reels and the like, the combination of a coil spring, a spring cup inclosing, and connected to one end of said spring, said cup having a flat annular head, friction disks in engagement with both faces of said annular head, a spring disk associated with said friction disks to produce a resilient pressure upon said annular head, and means for rotating said disks, to wind up said spring.

14. In a fishing reel, the combination of a frame, a spool pivotally supported therein, a spring for rotating said spool, means for winding up said spring, a spring drag pivoted upon said frame adjacent to a flange of said spool to bear thereon, and means for swinging said drag laterally upon its pivot, and a shoulder upon which said spring drag may be set for holding said spring drag out of engagement with said spool.

This specification signed and witnessed this 15th day of September, 1911.

PLINY CATUCCI.

Witnesses:
WALTER FINTER,
LOUIS M. SANDERS.